Aug. 20, 1957  R. C. RONFELDT  2,803,357

VEHICLE PUSHER UNLOADER

Filed July 2, 1954

INVENTOR.
RAY C. RONFELDT
BY
Merrill M. Blackburn
ATTORNEY

United States Patent Office 2,803,357
Patented Aug. 20, 1957

2,803,357

VEHICLE PUSHER UNLOADER

Ray C. Ronfeldt, Irwin, Iowa

Application July 2, 1954, Serial No. 440,974

5 Claims. (Cl. 214—82)

The present invention relates to unloaders for vehicles, such as wagons, trucks, and trailers, and is particularly concerned with unloaders of the type especially adapted to be used with and powered from farm tractors having available a remote cylinder and ram device actuated by the power of the tractor and arranged to be located remote from the tractor, being operatively connected thereto by a pair of hose.

Among the objects of this invention are:

The provision of a vehicle unloader adapted to be actuated by the power of a tractor associated with the vehicle;

The provision of an unloading mechanism which is easily attachable to the bed or box of an ordinary vehicle and which can be connected with the hydraulic system of the tractor to be driven thereby;

The provision of an unloader so constructed as to be operated by a hydraulic ram, positioned at the front of the vehicle, thereby avoiding long hose lines;

The provision of an unloading mechanism which includes a movable partition and an approximately longitudinally advancing means therefor, extending to the front of the vehicle;

And such further objects, advantages, and capabilities as will hereafter appear and as are inherent in the construction disclosed herein.

My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 7 is an enlarged sectional view taken substantially along the plane indicated by the line 7—7, in Fig. 1.

Figure 1:
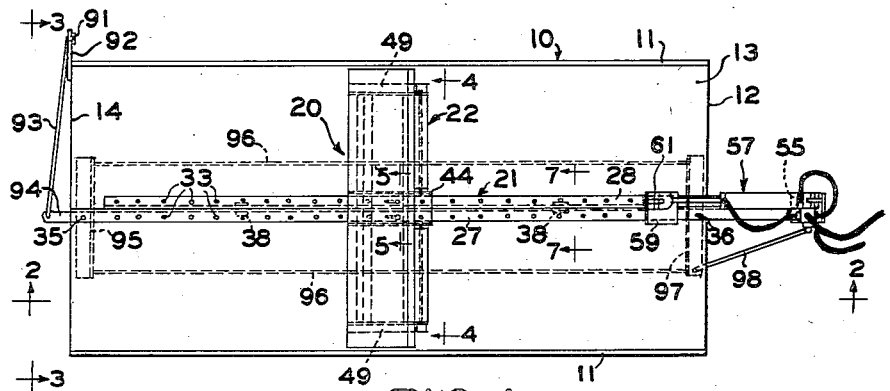
Fig. 1 is a plan view of a vehicle box in which an unloading mechanism, constructed to incorporate the features of this invention, has been installed.

The vehicle box is indicated in its entirety by the reference numeral 10 and includes side walls 11, a front end 12, a bed 13, and a rear end gate 14, preferably of the detachable or removable type. The unloader attachment, in which the principles of the present invention have been incorporated, is adapted to be mounted on the bed of a vehicle box of the type just described.

The unloader attachment is indicated in its entirety by the reference numeral 20 and includes a track 21, a movable partition 22, and mechanism 24 powered by a farm tractor or other suitable source of hydraulic power and is connected with a lever 95 for controllably advancing the partition along the bed of the vehicle box from the front to the rear, or vice versa, if desired, to discharge the contents from the box.

The track 21 comprises a pair of angle members 27 and 28 placed back to back, as will best be seen in Figs. 4 to 7. The upper or horizontal flanges 31 and 32 of the angle members 27 and 28 are provided with a series of openings 33, extending substantially from end to end, as will be seen in Figs. 1 and 5. The angle member 27 is attached in any suitable way to the bed 13 of the vehicle box, as by a long bolt 35, which also serves as a pivot for the lever 95, described below. The front end of the fixed angle member 27 is also connected rigidly to the bed 13 of the vehicle box by a second long bolt 36, as shown in Fig. 1. By the use of bearing plates or the like welded to the lower edge of the fixed angle member 27, the latter is held spaced a short distance above the plane of the bed of the box. This provides space for U-shaped guides 38, as shown in Fig. 7, which are secured by bolts 39 to the vehicle bed 13. The movable angle member 28 is held by the U-shaped guides 38 in order to be capable of limited fore and aft reciprocation. This is caused by the reciprocation of the piston rod 63 under the influence of the hydraulic ram unit 57. Such reciprocation of the hydraulic ram unit 57 is caused by the two-way valve 66 which is moved by the lever 95, acting through the cable 96, lever 97, and rod 98.

Figure 2:
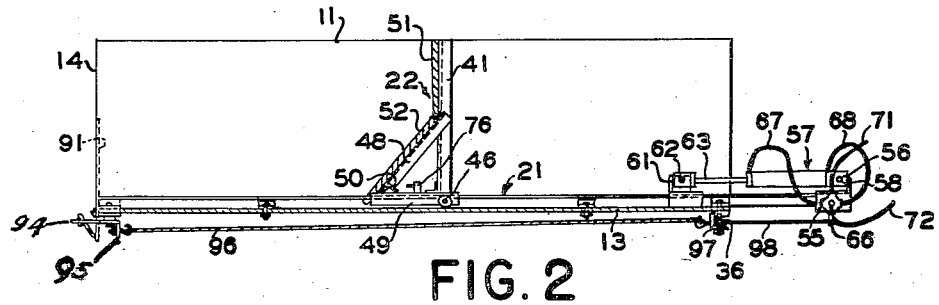
Fig. 2 is a sectional view of certain of the parts, taken substantially along the plane indicated by the line 2—2, in Fig. 1.
Figure 4:
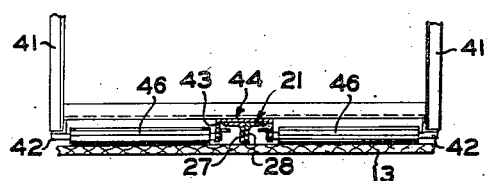
Fig. 4 is a sectional view taken substantially along the plane indicated by the line 4—4, in Fig. 1.

The movable partition 22 comprises a framework made up of vertical angles 41 connected at their lower ends to the outer ends of a pair of cross rods 42, as by welding or the like, and the inner ends of the rods 42 are attached in any suitable way, as by welding, to the lateral flanges 43 of a slide 44 of channel formation in inverted position over the track 21, as best shown in Fig. 4. Supporting rollers 46 are on the cross rods 42 and engage the bed 13 of the vehicle box to carry most of the weight and pressure of the movable partition 22. The latter also includes bracing structure in the form of a pair of diagonal angles 48 and side bars 49, all welded together, as illustrated in Figs. 1 and 2. Sheathing boards 51 or other suitable means complete the partition 22. A cross-bar 50 connects the diagonal bars 48 and reinforces the latter. The cross-bar 50 also slides along the upper face of the track 21, as shown by Fig. 2.

Figure 5:
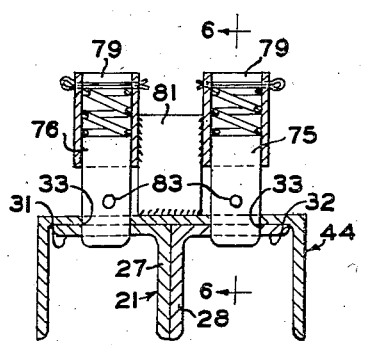
Fig. 5 is a fragmentary view, taken on an enlarged scale, along the plane indicated by the line 5—5, in Fig. 1.
Figure 6:
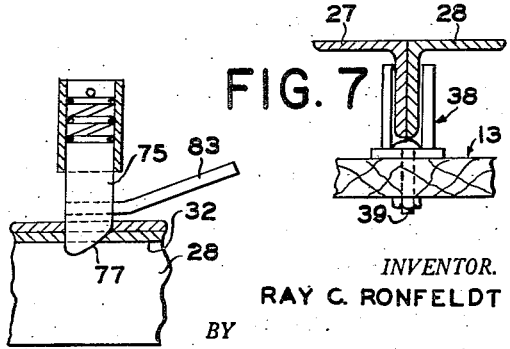
Fig. 6 is a sectional view taken substantially along the plane indicated by the line 6—6, in Fig. 5.

Carried on the front end of the movable angle member 28 is a bracket 55 having an upwardly extending apertured lug 56 which is adapted to receive the cylinder end of the hydraulic ram unit 57, by a quickly detachable pin 58, or the like. Mounted on or secured to the forward end of the movable angle member 28 is an inverted U-shaped slide 59 which also carries an upwardly extending apertured lug 61 which receives the outer end of a piston rod 63. The piston normally serves as a part of the hydraulic ram unit 57. The bracket 55 also carries the two-way valve 66, and a pair of hoses 67 and 68 lead from the two-way valve 66 to the opposite ends of the hydraulic ram unit 57. Hydraulic fluid under pressure is led to the valve 55 by a tube 71, and a low pressure or discharge tube 72 leads from the valve 66 to a point of discharge. Thus, when the hydraulic ram unit 57 is extended, the movable angle member 28 is moved rearwardly, and when the hydraulic ram unit 57 is retracted, the movable angle member 28 is moved forwardly. These reciprocations, or back and forth movements of the movable angle member 28, are used to successively advance the movable partition 22. To this end, the slide 44 carries a pair of pawls in the form of spring biased plungers 75 and 76, the lower ends of which are beveled, as indicated at 77 in Fig. 6. The upper end of each plunger is contained within a cylindrical section 79, and the two cylindrical sections 79 are welded to a vertical plate 81 which, in turn, is welded to the slide 44, as shown in Fig. 5. A handle is attached to each of the plungers 75 and 76. By using the handle 83, the plungers 75 and 76 may be reversed, whereby the reciprocation of the movable angle member 28 results in a withdrawal of the partition toward the front of the vehicle box. Also, by holding the handles 83 upwardly, the partition 22 may be moved manually to the desired position.

Figure 3:
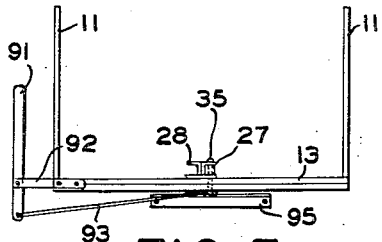
Fig. 3 is a rear end view, looking forwardly, taken substantially along the plane indicated by the line 3—3, in Fig. 1.

The means for moving the two-way valve 66 from one position to the other, in order to cause the hydraulic ram unit 57 to be alternately retracted and extended, is a vertical hand lever 91 at the rear end of the vehicle box, which lever is pivotally mounted on said vehicle box by a bracket 92. The lower end of the hand lever 91 is connected by a rod 93 to a rearwardly extending arm 94 secured to the lever 95 which is pivoted at a mid-point on the lower end of the long bolt 35, as shown in Fig. 3. As shown in Figs. 1 and 3, the arm 94 is not a continuation of the fixed angle member 27 but is short and is pivoted on the bolt 35. A pair of cables 96 connects the outer ends of the lever 95 to the outer ends of a similar lever 97 which is pivotally mounted at the front of the vehicle box, on the long bolt 36. A rod 98 connects lever 97 with the two-way valve 66.

Operation

After the vehicle has been pulled by the tractor to the location at which it is desired that it be unloaded, the hydraulic power system of the tractor is applied to the lugs 56 and 61 on the forward ends of the fixed angle member 27 and the movable angle member 28. The hose connections, normally extending from the hydraulic power system of the tractor to the hydraulic ram unit 57, are disconnected from the latter and applied to the short hose 71 and 72 which form a part of the reversing valve 66. The hose lines 67 and 68 from the valve 66 are then connected to the hydraulic ram unit 57. Using the handles 83, the pawls or spring biased plungers 75 and 76 are next turned in the proper direction to secure the desired movement of the partition 22. Then the tractor power system is actuated to deliver fluid under pressure to the valve 66. The hand lever 91 may then be swung back and forth and the motion will then be transmitted by the cables 96 to the front lever 97, and the latter, acting through the rod 98, will alternately move the reversing valve 66 from one position to the other. This will automatically cause extension and retraction of the hydraulic ram unit 57, thus reciprocating the movable angle member 28. Movement of the angle member 28 in this manner will act through the associated pawl or spring biased plunger 75 to move the partition 22 in one direction. Movement of the angle member 28 in the other direction will not retract the partition since the other pawl or spring biased plunger 76 will prevent such movement of the partition. Thus, during the advance of the partition 22, the pawl or spring biased plunger 76 rides idly from one opening 33 in the fixed angle member 27 to the other, and during movement of the angle member 28 in the other direction, the pawl or spring biased plunger 75 rides idly past the openings in the movable angle member 28. These pawls 75 and 76, with the openings 33 in the angle members 27 and 28 act as pawls and ratchets in moving the partition 22 forwardly or rearwardly. By turning the handle 83 through one hundred eighty degrees (180°), the movement of the partition may be reversed.

It is of course understood that the specific description of structure set forth above may be departed from without departing from the spirit of this invention as disclosed in this specification and as defined by the appended claims.

Having now described my invention, I claim:

1. An unloading device for vehicle boxes comprising a pair of elongated members positioned side by side along the bed of the vehicle box and at least one of said members extending outside of said box at one end thereof, a movable partition movable along said members substantially from one end to the other of said vehicle box, the other of said members being mounted for endwise reciprocation along said one member, means for attaching said one member to the bed of said vehicle box, advancing means carried by said partition and said other member whereby reciprocation of the latter moves said partition along the bed of said vehicle box, a cylinder-receiving means for a hydraulic ram unit whereby extension and retraction of the hydraulic ram unit, when carried on said cylinder-receiving means, serves to reciprocate said movable member, a reversing valve adapted to control the extension and retraction of the hydraulic ram unit connected with said cylinder-receiving means, and manually operable means positioned at the other end of the vehicle box and connected with said reversing valve for moving the latter from one position to another.

2. An unloading device as defined by claim 1, further characterized by manually operable means connected to reverse said advancing means whereby reciprocation of said other elongated member may be utilized to move said partition in either direction on the bed of the vehicle box.

3. An unloading device for vehicle boxes comprising a pair of elongated members positioned side by side along the bed of the vehicle box, a movable partition movable along said members substantially from one end to the other of said vehicle box, the other of said members being mounted for endwise reciprocation along said one member, means for attaching said one member to the bed of said vehicle box, advancing means carried by said partition and said other member whereby reciprocation of the latter moves said partition along the bed of said vehicle box, a cylinder-receiving means for a hydraulic ram unit whereby extension and retraction of the hydraulic ram unit, when carried on said cylinder-receiving means, serves to reciprocate said movable member, a reversing valve adapted to control the extension and retraction of the hydraulic ram unit connected with said cylinder-receiving means, and manually operable means positioned at the other end of the vehicle box and connected with said reversing valve for moving the latter from one position to another.

4. An unloading device for vehicle boxes comprising a pair of elongated members positioned side by side along the bed of the vehicle box, a movable partition movable along said members substantially from one end to the other of said vehicle box, the other of said members being mounted for endwise reciprocation along said one member, means for attaching said one member to the bed of said vehicle box, pawl and ratchet advancing means carried by said partition and said other member whereby reciprocation of the latter moves said partition along the bed of said vehicle box, a cylinder-receiving means for a hydraulic ram unit whereby extension and retraction of the hydraulic ram unit, when carried on said cylinder-receiving means, serves to reciprocate said movable member, a reversing valve adapted to control the extension and retraction of the hydraulic ram unit connected with said cylinder-receiving means, and manually operable means positioned at the other end of the vehicle box and connected with said reversing valve for moving the latter from one position to another.

5. An unloading device for vehicle boxes comprising a pair of elongated members positioned side by side along the bed of the vehicle box, a movable partition movable along said members substantially from one end to the other of said vehicle box, the other of said members being mounted for endwise reciprocation along said one member, a pair of spring-biased pawls carried by said partition and having beveled ends adapted to enter the apertures of said members, means on said partition supporting said pawls for rotation about substantially vertical axes through approximately one hundred eighty degrees (180°), whereby the beveled ends of said pawls may be positioned to face one direction or the opposite direction, according to the direction in which it is desired to move said partition, and means for turning said pawls, means for attaching said one member to the bed of said vehicle box, advancing means carried by said partition and said other member whereby reciprocation of the latter moves said partition along the bed of said vehicle box, a cylinder-receiving means for a hydraulic ram unit whereby extension and retraction of the hydraulic ram unit, when carried on said cylinder-receiving means, serves to reciprocate said movable member, a reversing valve adapted to control the extension and retraction of the hydraulic ram unit connected with said cylinder-receiving means, and manually operable means positioned at the other end of the vehicle box and connected with said reversing valve for moving the latter from one position to another.

References Cited in the file of this patent

UNITED STATES PATENTS

| | | |
|---|---|---|
| 1,962,228 | Abramson et al. | June 12, 1934 |
| 2,365,771 | Olson | Dec. 26, 1944 |
| 2,480,527 | Wachter | Aug. 30, 1949 |
| 2,557,003 | Le Laurin | June 12, 1951 |
| 2,657,009 | Neis et al. | Oct. 27, 1953 |
| 2,669,366 | Sievers | Feb. 16, 1954 |
| 2,696,313 | Gudikunst | Dec. 7, 1954 |
| 2,712,388 | Skromme et al. | July 5, 1955 |